W. L. ODDEY.
VAPORIZER FOR FUMIGATING, PERFUMING, AND THE LIKE.
APPLICATION FILED OCT. 20, 1911.
1,075,267.
Patented Oct. 7, 1913.
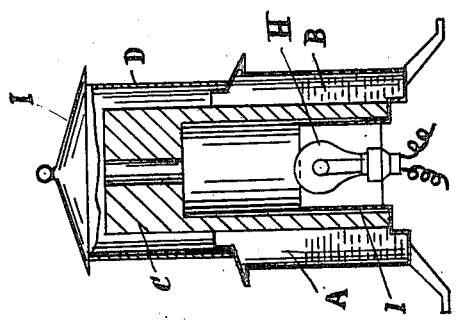
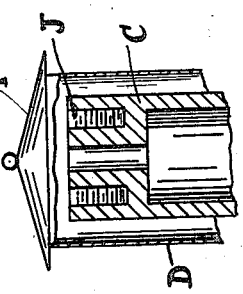
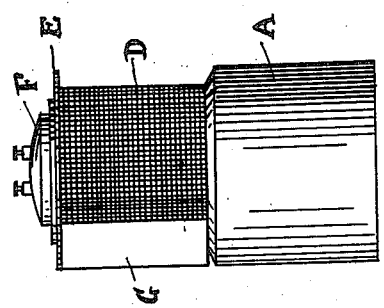
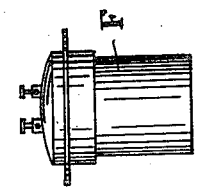
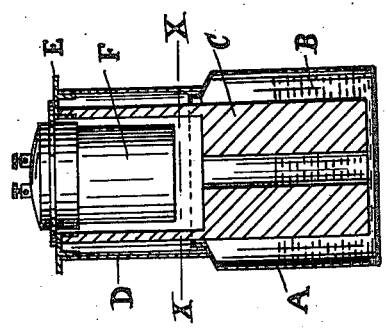
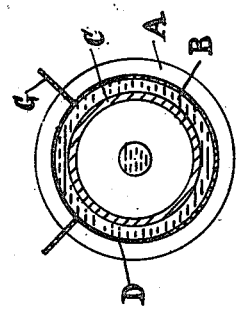

UNITED STATES PATENT OFFICE.

WILLIAM LOVELL ODDEY, OF ELTHAM, ENGLAND.

VAPORIZER FOR FUMIGATING, PERFUMING, AND THE LIKE.

1,075,267.     Specification of Letters Patent.     Patented Oct. 7, 1913.

Application filed October 20, 1911. Serial No. 655,764.

*To all whom it may concern:*

Be it known that I, WILLIAM LOVELL ODDEY, a subject of the King of Great Britain, residing at 1 Beech Hill road, Eltham, in the county of Kent, England, Great Britain, have invented new and useful Improvements in Vaporizers for Fumigating, Perfuming, and the like, in which absorbent materials have been used; and the object of my improvement is to apply heat to such absorbent material in such manner as to prevent the too-rapid volatilization of the fumigating or perfuming substance and at the same time to expose a large surface of absorbent material to the effect of the heat so applied thereto.

I attain my object by the apparatus illustrated by the accompanying drawing in which—

Figure 1 is a vertical section through an apparatus constructed according to this invention. Fig. 2 is an elevation of the same. Fig. 3 is a cross-section of the same on line X. X. Fig. 1. Fig. 4 is an elevation of an electric heater. Fig. 5 is a vertical section of a modified form of my invention Fig. 6 is a vertical section showing the absorbent material with a cavity or reservoir formed in its upper part.

Similar letters refer to similar parts throughout the several views.

A is a reservoir of glass or other suitable material containing a suitable liquid or other substance B to be vaporized.

C is a device of earthenware or other suitable absorbent material hereinafter referred to as the "block" adapted to be placed in the reservoir and to be partly immersed in the liquid or other substance contained therein and partly exposed to the air. In the construction as shown by Fig. 1 the block has more material at its lower part than at its upper part and is hollow. Surrounding that part of the block C exposed to the air is a protector D made of perforated metal, wire gauze or the like which may be attached to a ring E which rests on the top of the block C.

F is an electric heater which is supported by the ring E and projects inside the block C as shown by Fig. 1.

G is a deflector preferably of sheet metal attached to the protector portion of the apparatus.

In the modified form of my invention shown by Fig. 5 the block C has more material at its upper part than at its lower part and an electric lamp H or other source of heat is placed inside the block. In such case the reservoir is formed as shown at 1 in such figure. The said block in some cases may be provided with lateral perforations and may also in some cases be glazed at its inner surfaces.

I is a cover which is provided when the construction is according to Figs. 5 and 6.

It is obvious that what is hereinbefore referred to as the block may be made of felt or textile fabric, pumice stone or any suitable absorbent material.

When in use the reservoir is charged with the liquid to be vaporized, the block is placed in the reservoir as shown and the electric heater or other source of heat placed in the block or otherwise applied thereto. As soon as the liquid has risen up the block by capillary attraction the current is switched on or other heat applied thus causing evaporation at the desired rate to take place, the vapor being dissipated by the ordinary air currents or accelerated by means of a fan which, with a motor for driving it, I may attach to the apparatus if desired.

When my apparatus is constructed according to the modification illustrated by Fig. 5 of the drawing I may form a cavity J at the upper portion of the block surrounding the hollow therein as shown in Fig. 6 for the reception also of the liquid or other suitable substance to be vaporized. It will be obvious that in no case would such cavity J be glazed.

I claim:—

1. In a vaporizer, in combination, a container for the substance to be vaporized, a hollow absorbent block therein adapted to be surrounded by said substance, the said block having a reservoir formed therein, and a source of heat positioned within the said hollow block.

2. In a vaporizer, in combination, a container adapted to contain the substance to be vaporized, a reticulated protector positioned above said container, a hollow absorbent block inclosed within said container and said protector whereby the lower portion of the block will be surrounded by the substance and the upper portion of the block will be exposed to the air, and a source of heat positioned within said hollow block.

WILLIAM LOVELL ODDEY.

Witnesses:
W. C. FOWLER,
B. K. FOWLER.